July 23, 1935. J. H. BLOOD 2,008,812
BEVERAGE SHAKER
Filed June 4, 1932
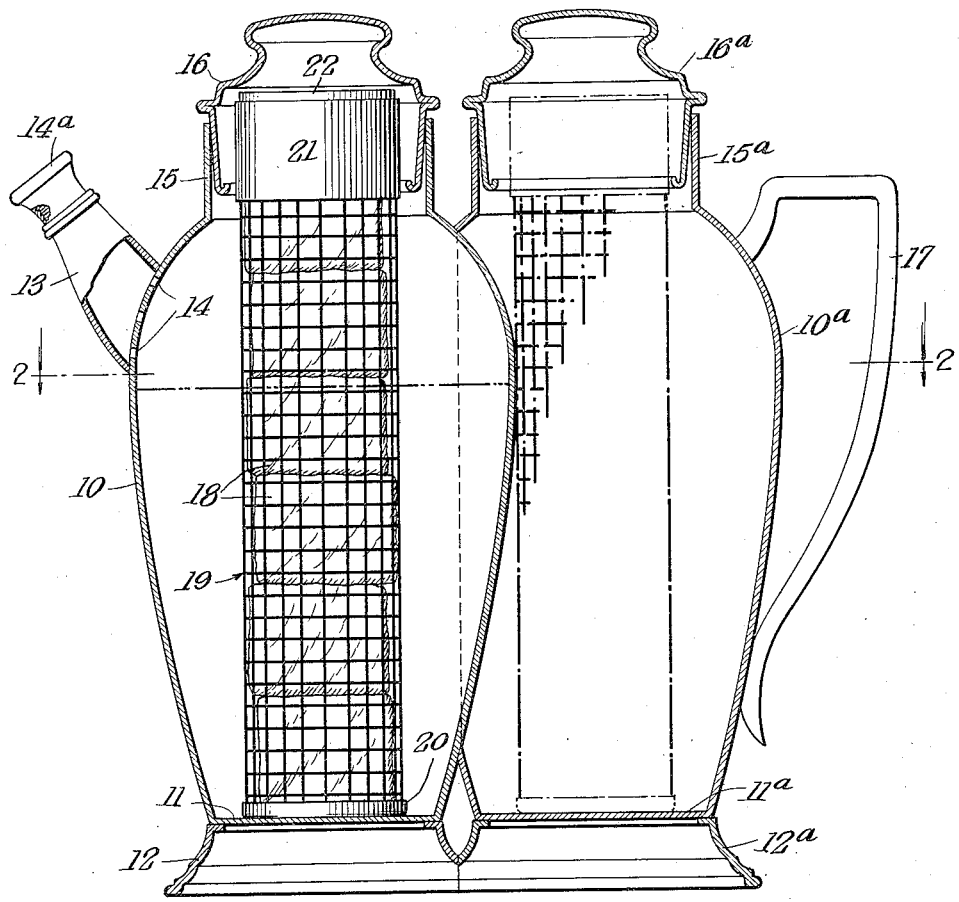
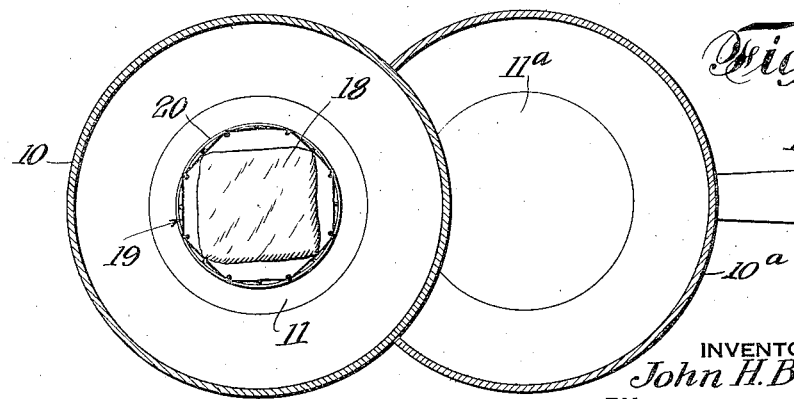
INVENTOR
John H. Blood
BY
ATTORNEY Patented July 23, 1935

2,008,812

UNITED STATES PATENT OFFICE 2,008,812

BEVERAGE SHAKER

John H. Blood, New York, N. Y.

Application June 4, 1932, Serial No. 615,455

6 Claims. (Cl. 220—1)

This invention relates to a beverage shaker and more particularly to a beverage shaker having a beverage compartment adapted to receive both the beverage and a cooling device containing solidified refrigerant, such as ice, and a cooling compartment separated from the beverage compartment by heat conducting material and adapted to receive the cooling device when the latter is removed from the beverage compartment.

An important object of the invention is to provide an advantageous device of the character referred to wherein the beverage may be cooled during the shaking thereof and other preparation and may be maintained in cooled condition by refrigerant in the cooling compartment. Another important object is to provide a device of the character described whereby the beverage may be cooled during preparation and may then be maintained in cooled condition without further dilution.

According to a preferred form of carrying out the invention, the shaker includes a beverage compartment provided at its top with a neck normally closed by a stopper and at its front with a spout on which is removably secured a suitable cap, and a cooling compartment at one side of the beverage compartment and separated therefrom by a relatively thin heat conducting partition, said cooling compartment being provided at its top with a neck and a stopper similar to those of the top of the beverage compartment. Preferably cooling is effected by a solidified refrigerant, such as ice, enclosed in a holder of such length that when resting on the bottom of either the beverage compartment or the cooling compartment its top will project into the lower end of the stopper which is hollow for this purpose. In its preferred form the main portion of the periphery of the refrigerant holder is of open work material such as a perforated or wire network screen and the upper end of the holder which projects into the stopper of the compartment in which it is positioned has a closed peripheral surface. In use the ingredients of the beverage are placed in the beverage compartment, the cooling element containing solid refrigerant, such as ice, is introduced into this compartment, and the stopper placed in the neck of the beverage compartment with its lower end surrounding the upper end of the holder or refrigerant container.

After the beverage has been shaken in direct contact with the ice in the holder and is suitably cooled, the holder is removed from the beverage compartment in order to avoid further dilution of the beverage and is placed in the cooling compartment where the refrigerant may act through the separating partition to maintain the beverage in cooled condition, it being understood that the stoppers are to be returned to effective position in the corresponding necks after the refrigerant holder is removed from the beverage compartment and placed in the cooling compartment.

In the event that it is desired to avoid entirely dilution of material in the beverage compartment the refrigerant holder may be liquid tight at its lateral or peripheral surface and lower end and may be closed tightly at its upper end by means of a suitable stopper or cork.

Other objects and advantages will appear upon consideration of the following description and of the drawing, in which:

Fig. 1 is a vertical section through the spout and handle; and

Fig. 2 is a section taken along the line 2—2 of Fig. 1.

Referring to the drawing, the beverage shaker of the present invention includes a beverage compartment 10 provided with a bottom 11 at the top of a base 12, a spout 13 communicating with the interior of the compartment through openings or perforations 14 and closed at its outer end by a cap 14a removably held thereon by any suitable means such as cooperating screw threads, and a neck 15 at the top adapted to receive a hollow stopper 16. Attached to the beverage compartment 10 at the side opposite the spout 13 is a cooling compartment 10a which, as illustrated, is preferably substantially the same in shape as the beverage compartment except at the side adjacent to the beverage compartment where it is cut away to fit over the corresponding portion of the beverage compartment.

The connection between the open side of the cooling compartment and the wall of the beverage compartment is such as to effect a liquid tight seal, in any suitable manner, as by brazing. The cooling compartment includes a bottom 11a resting on a base 12a similar to the base 12 of the beverage compartment, and is provided at its top with a neck 15a and a hollow stopper 16a corresponding to those of the beverage compartment. As illustrated in Fig. 1, the bases 12 and 12a are cut away at their adjacent sides to permit them to be positioned close enough to each other to correspond to the positions of the beverage compartment 10 and the cooling compartment 10a, the adjacent edges of the bases being joined in any suitable manner, as by brazing. At the side of the cooling compartment 10a farthest from the spout 13, that is at the rear of the shaker, there is provided a handle 17 which may be of any suitable shape.

It will be evident that, in use, cooling of the beverage may be effected by a limited amount of ice or other suitable refrigerant placed directly in the beverage compartment and that ice placed in the cooling compartment may be used either to effect cooling of the beverage in the beverage compartment or to maintain the beverage in cooled condition. Preferably, however, ice or other suitable refrigerant 18 is placed in a suitable holder 19 of open work material from its lower end 20 to its imperforate upper end 21 which projects into the tapered lower end of the stopper 16 and is limited as to sidewise movement by the inturned lower edge of the tapered part of the stopper. When a holder 19 of the type described is used the beverage is in direct contact with the refrigerant or ice during the shaking of the beverage, thus diluting the beverage to a slight extent during cooling. The stopper 16 is then removed to permit removal of the holder 19 and is replaced after such removal. The stopper 16a is then removed from the neck of the cooling compartment, the holder 19 inserted into the cooling compartment and the stopper 16a replaced. The ice or other solidified refrigerant will then act to keep the beverage cool. If desired, the refrigerant holder 19 may be provided with a suitable stopper 22 to hold the refrigerant therein.

If for any reason it be desirable to prevent contact between the solidified refrigerant and the beverage, the refrigerant holder may be liquid tight at the sides and bottom and closed at the top by a stopper. With this arrangement, there will, of course, be no dilution of the beverage at any time. The cooling effect will, however, be greatest when the refrigerant holder is in the beverage compartment.

It will be evident also that the cooling effect of the cooling compartment may be produced by supplying ice or the like to the cooling compartment independently of any ice used in the refrigerant holder.

The foregoing detailed description has been given for clearness of understanding and no undue limitation should be deduced therefrom, but the appended claims should be construed as broadly as possible in view of the prior art.

Having thus described my invention, I claim:

1. A beverage shaker including a beverage compartment provided with a spout at its front and an open neck at its top, a cooling compartment separated from the beverage compartment by a thin partition adapted to conduct heat readily therethrough and having an open neck at its top, a refrigerant holder adapted to be inserted through the neck of either of said compartments and to rest on the bottom thereof with its upper end in such neck, and stoppers, one for each of said necks, having hollow lower ends adapted to fit over the upper end of the refrigerant holder when the holder is in the corresponding compartments.

2. A beverage shaker including a beverage compartment provided at its front with a spout and a cap removably secured on the spout and at its top with an open neck, a cooling compartment separated from the beverage compartment by a thin partition adapted to conduct heat readily therethrough, a refrigerant holder adapted to hold ice and to be inserted through the neck of the beverage compartment, and a stopper for the neck at the top of the beverage compartment, said refrigerant holder having open-work parts whereby ice therein is in contact with the beverage while the holder is in the beverage compartment and enabling the ice to be removed readily from the beverage compartment to prevent excessive dilution of the beverage.

3. A beverage shaker including a beverage compartment at its front provided with a spout and an open neck at its top, a cooling compartment at the rear of the beverage compartment and separated therefrom by a heat conducting partition whereby material in the beverage compartment may be cooled by refrigerant in the cooling compartment, an ice holder adapted for insertion and removal through said open neck and having its upper end in said neck when in the beverage compartment, and a hollow stopper to fit in said neck and to receive the upper end of said holder.

4. A beverage shaker including a beverage compartment provided with a spout and at its upper part with an open neck, a refrigerant holder adapted to pass through said neck and of such length that when placed in said beverage compartment its upper end will be in said neck, a stopper for the upper end of said holder, a stopper for said neck, and a cooling compartment separated from said beverage compartment by a thin heat conducting partition whereby material in the beverage compartment may be cooled by refrigerant in the cooling compartment.

5. A beverage shaker comprising a beverage compartment provided with a spout, a cooling compartment adjoining the beverage compartment, a removably perforated ice container adapted to be placed in the beverage compartment during the shaking and preliminary cooling of the beverage and to be removed therefrom and placed in the cooling compartment for continued cooling of the beverage after the preliminary cooling thereof, and removable stoppers for the beverage and cooling compartments.

6. A beverage shaker open at the top and provided with removable means for closing the opening and comprising a beverage compartment provided with a spout, a cooling compartment operatively associated with the beverage compartment, a removable perforated refrigerant container adapted to hold ice and to be placed in the beverage compartment during the shaking and preliminary cooling of the beverage with the ice in direct contact with the beverage and thereafter to be placed in the cooling compartment for continued cooling of the beverage after the preliminary cooling thereof, the cooling compartment being so constructed and so related to the refrigerant holder that when the refrigerant holder is placed therein the refrigerant holder is separated from the beverage in such manner that no dilution of the beverage may take place from the melting ice therein contained.

JOHN H. BLOOD.